(12) United States Patent
Samson et al.

(10) Patent No.: US 7,698,345 B2
(45) Date of Patent: Apr. 13, 2010

(54) METHODS AND APPARATUS FOR FUSING DATABASES

(75) Inventors: Jerome Samson, Belleair, FL (US); Francis G. McMillian, Clearwater, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 176 days.

(21) Appl. No.: 10/576,800

(22) PCT Filed: Oct. 21, 2003

(86) PCT No.: PCT/US03/33392

§ 371 (c)(1), (2), (4) Date: Feb. 14, 2008

(87) PCT Pub. No.: WO2005/050482

PCT Pub. Date: Jun. 2, 2005

(65) Prior Publication Data

US 2008/0215602 A1  Sep. 4, 2008

(51) Int. Cl.
G06F 17/30 (2006.01)
G06F 7/00 (2006.01)

(52) U.S. Cl. .................. 707/780; 707/758; 707/808

(58) Field of Classification Search .......... 707/6, 707/200
See application file for complete search history.

(56) References Cited

U.S. PATENT DOCUMENTS

| | | | |
|---|---|---|---|
| 4,781,596 A | 11/1988 | Weinblatt | |
| 5,401,946 A | 3/1995 | Weinblatt | |
| 5,515,270 A | 5/1996 | Weinblatt | |
| 5,963,653 A | 10/1999 | McNary et al. | |
| 5,970,482 A * | 10/1999 | Pham et al. | 706/16 |
| 6,029,161 A | 2/2000 | Lang et al. | |
| 6,287,123 B1 * | 9/2001 | O'Brien | 434/118 |
| 6,289,514 B1 | 9/2001 | Link et al. | |
| 6,308,175 B1 | 10/2001 | Lang et al. | |
| 6,334,131 B2 | 12/2001 | Chakrabarti et al. | |
| 6,370,547 B1 * | 4/2002 | Eftink | 707/201 |
| 6,389,429 B1 | 5/2002 | Kane et al. | |
| 6,400,996 B1 | 6/2002 | Hoffberg et al. | |

(Continued)

FOREIGN PATENT DOCUMENTS

WO    WO02/076005 A2    9/2002

(Continued)

OTHER PUBLICATIONS

Patent Cooperation Treaty, International Search Report for PCT/US03/33392, Feb. 23, 2004, 4 pages.

Primary Examiner—Kuen S Lu
(74) Attorney, Agent, or Firm—Hanley, Flight & Zimmerman, LLC (57) ABSTRACT

Methods and apparatus for fusing multiple databases into a single database are disclosed. A disclosed method determines a ranking of a plurality of matching variables associated with first and second datasets and generates a hierarchical matching grid including a plurality of levels based on the ranking of the plurality of matching variables. The example method identifies first and second sets of match candidates from the first and second datasets based on successive levels of the hierarchical matching grid and fuses records in the first and second sets of match candidates based on probabilities associated with the records.

20 Claims, 8 Drawing Sheets

U.S. PATENT DOCUMENTS

| | | |
|---|---|---|
| 6,408,294 B1 | 6/2002 | Getchius et al. |
| 6,430,539 B1 | 8/2002 | Lazarus et al. |
| 6,470,329 B1 | 10/2002 | Livschitz |
| 6,484,158 B1 | 11/2002 | Johnson et al. |
| 6,556,987 B1 * | 4/2003 | Brown et al. ............... 707/3 |
| 6,611,842 B1 | 8/2003 | Brown |
| 6,618,725 B1 | 9/2003 | Fukuda et al. |
| 6,701,309 B1 | 3/2004 | Beeferman et al. |
| 6,728,713 B1 | 4/2004 | Beach et al. |
| 6,816,850 B2 | 11/2004 | Culliss |
| 6,820,076 B2 | 11/2004 | Bailey et al. |
| 6,823,328 B2 | 11/2004 | Schreiber |
| 7,035,855 B1 | 4/2006 | Kilger et al. |
| 7,139,723 B2 | 11/2006 | Conkwright et al. |
| 2001/0037323 A1 | 11/2001 | Moulton et al. |
| 2002/0026348 A1 | 2/2002 | Fowler et al. |
| 2002/0026390 A1 * | 2/2002 | Ulenas et al. ............... 705/27 |
| 2002/0087967 A1 | 7/2002 | Conkwright et al. |
| 2002/0138492 A1 | 9/2002 | Kil |
| 2002/0188689 A1 * | 12/2002 | Michael ............... 709/206 |
| 2003/0041056 A1 | 2/2003 | Bossemeyer, Jr. et al. |
| 2003/0051240 A1 | 3/2003 | Schaffer et al. |
| 2003/0105660 A1 | 6/2003 | Walsh et al. |
| 2003/0105694 A1 | 6/2003 | Conkwright et al. |
| 2003/0130998 A1 | 7/2003 | Fox et al. |
| 2003/0182249 A1 | 9/2003 | Buczak |
| 2003/0182284 A1 | 9/2003 | Russell |
| 2003/0182296 A1 * | 9/2003 | Sato et al. ............... 707/100 |
| 2004/0012631 A1 | 1/2004 | Skorski |
| 2004/0049473 A1 | 3/2004 | Gower et al. |
| 2004/0254809 A1 | 12/2004 | Teicher |
| 2004/0267774 A1 | 12/2004 | Lin et al. |
| 2005/0065955 A1 | 3/2005 | Babikov et al. |

FOREIGN PATENT DOCUMENTS

| | | |
|---|---|---|
| WO | WO03/052552 A2 | 6/2003 |
| WO | WO03/052662 A1 | 6/2003 |
| WO | WO2005/050482 A1 | 6/2005 |

* cited by examiner

METHODS AND APPARATUS FOR FUSING DATABASES

FIELD OF THE DISCLOSURE

The present disclosure relates generally to processing database information and, more specifically, to methods and apparatus for fusing multiple databases into a single database.

BACKGROUND

Successful planning, development, deployment and marketing of products and services depend heavily on having access to relevant, high quality market research data. Companies have long recognized that improving the manners in which marketing data is collected, processed and analyzed often results in more effective delivery of the right products and services to consumers and increased revenues. Recently, companies have sought to more effectively target marketing efforts toward specific groups or individuals having certain combinations of demographic characteristics and psychographic profiles. Such highly targeted marketing efforts may provide a company a significant competitive advantage, particularly for highly competitive markets in which increased revenues are obtained primarily as a result of increased market share.

To develop more effective marketing data, market researchers often use special-purpose population or market research panels or surveys, each of which may be assembled to include panelists or respondents having a particular combination of demographic characteristics and psychographic profiles. Typically, before any report can be produced, panel members or respondents are assigned a statistical weight in order to compensate for bias that may be introduced by the panel or respondent selection process and to ensure that the resulting panel or respondent group is representative of the population under study. Such special-purpose population or respondent panels and surveys may provide highly relevant marketing data or information in connection with a particular type or group of products and services. These special-purpose population or respondent panels or surveys are typically used to study particular subjects or narrowly focused consumption behaviors such as, for example, media consumption activities, consumption of particular types of grocery store items, voting intentions, etc. For example, a media research company may utilize population or respondent panels and surveys to measure and analyze the media consumption behaviors (e.g., television audience viewing behaviors) of particular groups within a population. The media research company may then use the collected media consumption behavior data to improve media planning activities, media-based promotional or advertising activities, etc.

Regardless of the end use of the type of data gathered via research panels and surveys, such panels and surveys are expensive to assemble. In addition, such research panels and surveys are expensive to maintain and typically result in data that is highly sensitive to fluctuations in panelist or respondent cooperation. As a result, broadening a market research panel or survey to cover multiple types of consumption activities, behaviors, preferences, etc. is often impractical or infeasible.

Market researchers have long dealt with the practical tradeoff between the desire to develop database information that enables companies to develop and deploy highly targeted marketing plans and the desire to develop database information that is more versatile in its application or utility. For example, a database developed from a respondent panel or survey that has been narrowly tailored to provide information related to the television viewing behaviors of a particular regional population having a particular demographic profile may be of little, if any, use when attempting to determine the fast food consumption habits of another population having that same demographic profile.

In response to the practical difficulties (e.g., the cost) associated with assembling market research panels or surveys covering multiple types of consumption activities, behaviors, preferences, etc., market researchers have employed database fusion techniques to efficiently merge or fuse database information from multiple research panels or surveys (typically two at a time) into a single database representing a single virtual population group or respondent-level panel. It is well known that the fusion of two datasets or databases into one dataset or database may enable the development of a database that reveals correlations between the consumption activities, preferences, etc. associated with two datasets or databases in a manner that the individual datasets could not. In other words, existing market research databases can be combined or fused in different ways to generate new datasets or databases that reveal respondent behaviors and/or relationships not previously revealed by the independent databases, without having to physically develop and pay for an expensive multi-purpose respondent panel or survey.

Although known dataset or database fusion techniques and/or systems may enable the fusing of two datasets containing significantly different types of respondent consumption behavior or preferences (e.g., television viewing behavior and soft drink preferences), these existing techniques or systems suffer from several deficiencies. In particular, known database fusion systems or techniques use distance functions to match respondent records in different datasets and to combine the behavioral data of the matched records. However, defining a distance function is a highly subjective process because distance functions often require the use of matching variable (e.g., demographic category) weighting factors or coefficients that inherently incorporate a subjective or arbitrary judgment of the relative importance of the matching variables by the person responsible for the assemblage of the fused database. In addition to being inherently subjective or arbitrary, the nature of the distance function and its coefficients may also be adjusted from time to time in order to fit the data on hand. As a result, the trendability from one data fusion (of the same two types of datasets or databases) to a subsequent data fusion is jeopardized.

Still further, existing database fusion systems and techniques typically match records between databases based on the order in which data records are stored in the databases. However, the order in which data records are stored in the databases to be fused is often completely arbitrary with respect to the degree to which the records in the databases match each other. Thus, the subjective and arbitrary nature of datasets or databases generated using known fusion techniques or systems decreases significantly the usefulness and value of these virtual datasets or databases.

DETAILED DESCRIPTION

In general, the dataset or database fusion methods and apparatus described herein determine and rank matching variables to perform a hierarchical search or scan of records in multiple datasets or databases to be fused, merged or otherwise combined. In addition, the database fusion apparatus and methods described herein use an iterative process that fuses like-candidates or records together in accordance with the statistical weights the records carry in their original dataset or database.

More specifically, a ranking of the matching variables is established and the database fusion apparatus and methods described herein build a grid table or matching grid showing all the combinations of matching variables based on their order of importance (ranking). Each row of the grid table is composed of a base 2 (binary) number. As a result, all digits on the grid table grid are zeros and ones. For each binary number in the grid table, the first significant digit (from left to right) indicates the highest-ranking matching variable. If a digit is a one, a match on the variable corresponding to that digit is requested or required. If a digit is a zero, then a match on the variable corresponding to that digit is not requested nor required. As described in greater detail below, the grid table is generated before datasets or databases are fused. Once the grid table is generated or populated, the database fusion apparatus may use the grid table or matching grid to determine what subsets of records to retrieve to fuse those records.

Records of the datasets or databases to be fused may then be scanned or searched in a hierarchical manner for matches that correspond to successively decreasing binary values of the grid table. Thus, a binary "1" in a bit position indicates that a match on that variable is required or requested, whereas a binary "0" indicates a normality condition (e.g., no match required or requested) and each level of the scan or search hierarchy may be used in succession to develop match candidates (i.e., records that satisfy the match criteria as defined by the pattern of ones and zeros in the binary numbers) for that level. For example, in a case where four matching variables are used, a first level of the scan or search may be based on the binary value "1111," and all records for which the values of all four matching variables match are identified as match candidates. A subsequent or second level scan or search may be based on the binary value "1110," and all records for which the values of the three most important matching variables match may be identified as match candidates for the second level. In yet another subsequent or third level scan or search based on the binary value "1101," all records for which the values of the two most important and the least important matching variables match may be identified as match candidates. Additional scans or searches progress through the levels in a similar manner until all records are matched or until all of the binary values associated with the binary search or scan are exhausted (e.g., until the binary value "0000" has been used to scan or search the records).

The database fusion apparatus and methods described herein may require a strict matching (e.g., identical matching) of matching variable values to establish a match for a given bit position during a scan or search level as suggested by the example above. Alternatively or additionally, the database fusion apparatus and methods described herein may allow skewed matching (e.g., close matching as opposed to exact matching) of one or more of the matching variable values.

For example, in a case where one of the matching variables is household income, the binary search or scan hierarchy may be defined to allow a skew on the household income variable so that if two records have household income range variable values (e.g., $0-$10K, $10-$20K, $20-$30K, etc.) that are in adjacent categories (e.g., one record holds the value $10-$20K while the other record holds the value $20-$30K), a skew of one category for the household income variable would result in a close match for the household income variable of those records. In other examples, a skew may be associated with additional or different ones of the matching variables and a skew of more than one category (e.g., a skew of two categories) may be used with one or more of the matching variables.

The database fusion apparatus and methods disclosed herein employ a probabilistic fusion technique in which each match candidate from one dataset or database (i.e., a record that satisfied the match criteria at a level of the above-outlined binary search hierarchy) is afforded a chance to form a fused data record with each corresponding candidate from the other dataset or database in a manner that is commensurate with the amount of statistical weight, if any, each candidate (e.g., respondent record) was afforded in its original dataset or database. As described in greater detail below, overweight sets of match candidates are dealt with by passing the amount of overweight to the next level of the match hierarchy (e.g., from the "1111" level to the "1110" level in the example where four matching variables are used).

Before providing a detailed discussion of the above-outlined database fusion apparatus and methods, a general discussion of known database fusion techniques is provided. Known database fusion techniques have typically been based on distance functions that measure the closeness of or distance between one respondent or record in a first dataset or database and another respondent or record in a second dataset or database. In general, with these known fusion techniques, the value associated with a particular respondent or record within a database may be thought of as a vector in an m-dimensional space defined by the m matching variables used to perform the fusion. In an example where the matching variables gender (G), age (A) and race (R) are used (i.e., m=3), values associated with a respondent or record X in the first dataset or database and a respondent or record Y in the second dataset or database may be represented using the three dimensional vectors $X=(G_x, A_x, R_x)$ and $Y=(G_y, A_y, R_y)$, respectively. One known distance function that may be used to determine the closeness of the records (i.e., respondents) X and Y is commonly referred to as a Mahalabonis or taxi-driver distance, an example of which is shown in Equation 1 below.

$$D_{x,y} = g^*|G_x - G_y| + a^*|A_x - A_y| + r^*|R_x - R_y| \quad \text{Equation 1}$$

Another known distance function that may be used to determine the closeness of the records X and Y, commonly referred to as a Euclidean distance (i.e., shortest distance) function, is shown by way of example in Equation 2 below.

$$D_{x,y} = SQRT[g^*(G_x - G_y)^2 + a^*(A_x - A_y)^2 + r^*(R_x - R_y)^2] \quad \text{Equation 2}$$

Typically the determination of the coefficients g, a and r is a trial-and-error process in which a market researcher attempts to make the resulting distance data consistent with reality. However, the process of selecting the form or nature of the distance function and its coefficients usually involves a substantial number of subjective or arbitrary judgments. For example, selecting the relative magnitudes of the coefficients g and a involves deciding at what point a difference in age and a difference in gender are equivalent (i.e., result in vector components having equivalent magnitudes). Likewise, selecting the coefficient r involves deciding at what point race is equivalent to gender and age.

The difficulty surrounding selection of the distance function coefficients is compounded by the fact that certain vector components or matching variables such as gender and race are substantially non-continuous. As a result, the market researcher is forced to consider, for example, whether a difference between Caucasians and African Americans is the same as a difference between Asians and Caucasians. Thus, the distance function coefficient selections made by the market researcher are, at best, subject to a substantial amount of personal judgment and may be completely arbitrary or inappropriate.

The problem of market researcher subjectivity is also compounded by the fact that different coefficients and possibly different distance functions altogether may be selected by the same or a different market researcher at different times. As a result, different coefficients or distance functions may constitute a better fit for the particular datasets or databases on hand. Specifically, a database fusion performed at one time may be performed using certain coefficients and, at another time (e.g., several months later), a completely different set of coefficients may be used. As a result, the data contained within a series of fused databases derived from the same original datasets or databases (or databases succeeding those original databases) may not be trendable in a meaningful manner.

As set forth above, known distance functions are significantly subjective and/or arbitrary in nature. However, it is important to also recognize that the vast majority of distance functions currently used by fusion practitioners are linear (i.e., the functions perform a linear summation of matching variable differences). While such linear functions are computationally preferable due to their simplicity and the speed at which they can be carried out by a processor-based system, such linear functions are not necessarily consistent with reality and, in fact, may be completely arbitrary. For instance, non-linear or non-polynomial functions may actually be more appropriate for measuring the real world differences between certain types of matching variables and database records such as, for example, respondent database records within marketing databases.

The above-described known database record matching techniques are commonly employed with known database fusion techniques, which are typically based on well-known transportation models. When using known transportation models to fuse two marketing datasets or databases containing respondent records, respondents or records in one of the databases are considered to be suppliers having a supply capacity commensurate with their relative weight and respondents or records in the other database are considered to be consumers having a demand commensurate with their relative weight within their respective database. The shipping costs (i.e., the distance function result) between suppliers (i.e., respondents in one database) and consumers (i.e., respondents in the other database) are then computed and the model attempts to satisfy demand while minimizing shipping costs. In other words, in the context of fusing two datasets or databases containing marketing data, known fusion techniques calculate the distances between respondents or records in the two datasets or databases and attempt to fuse records in a manner that minimizes the sum of all the distances between fused records (i.e., maximize the closeness of the fused records as a whole) in the resulting fused dataset or database.

Figure 1:
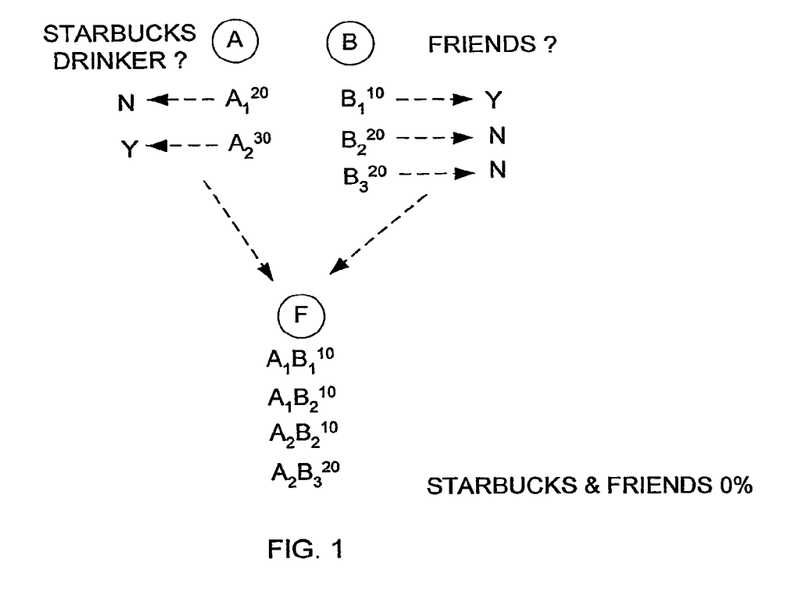
FIG. 1 depicts an example fusion of two datasets into a single fused dataset using a known fusion technique.
Figure 2:
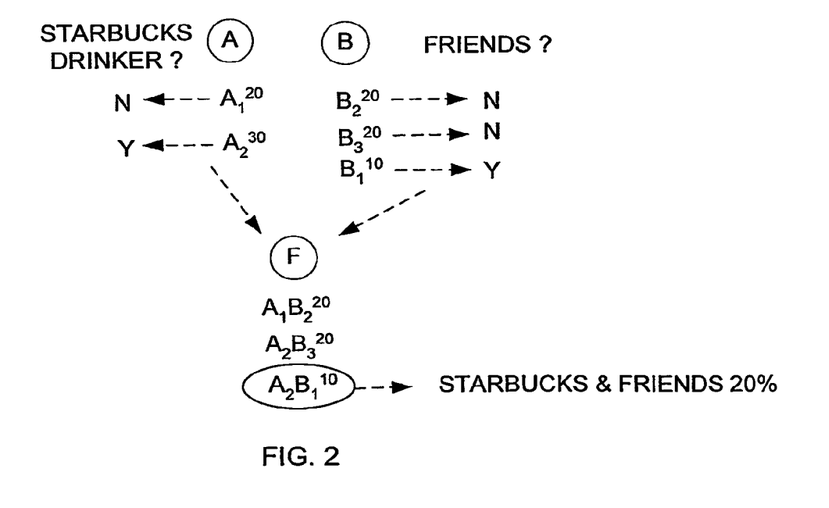
FIG. 2 depicts an example of the effect that ordering may have on fusion results when fusing two datasets using the known fusion technique described in connection with FIG. 1.

However, known transportation models or techniques produce fused database results that vary depending on the manner in which respondents or records are ordered within the original datasets or databases to be fused. In particular, suppliers (e.g., respondents or records) in the first database are considered in the order in which they are stored in their database and their available supply (i.e., weight) is divided among consumers (e.g., respondents or records in the other database) in the order in which the consumers are stored in their database until the supplier's supply has been exhausted. Once exhausted, these known transportation models or techniques then move to the next supplier and distribute its supply to satisfy remaining demand by consumers until all demand has been satisfied. As a result, these known transportation model techniques may preclude finding the best matches between respondents or records (i.e., suppliers and consumers) if, for example, a supplier that occurs early in the supplier database has its supply divided among consumers that occur early in the consumer database, but which would be better matched with a consumer that occurs later in the consumer database. FIGS. 1 and 2 described in detail below depict one example of the manner in which data or records ordering may affect the fused dataset or database results produced using known fusion techniques.

FIG. 1 represents a fusion of two databases or datasets "A" and "B" into a database or dataset "F." The records of the datasets shown in FIG. 1 are depicted so that $K_x^y$ corresponds to respondent x in dataset K having a weight y. Thus, $A_1^{20}$ corresponds to the first respondent record in the dataset A and has a weight (i.e., a supply) of 20. For purposes of discussion, each of the respondent records in the dataset A includes a yes (Y) or no (N) answer to the question "Do you drink Starbucks?" Whereas, each of the respondent records in the dataset B includes a yes or no answer to the question "Do you watch the television program Friends?" The fused dataset F may then be used to determine a relationship, if any, between consumption of Starbucks coffee and the viewing of Friends.

The fused dataset F is formed using known transportation model techniques. In particular, the supply or weight of the first respondent supplier in the dataset A (i.e., $A_1$), which in this example is "20," is allocated to the respondents in the dataset B (i.e., the consumers) in order. Thus, 10 units of the 20 available from $A_1$ are first allocated to $B_1$ to form the fused record $A_1B_1^{10}$ and the remaining 10 units are allocated to $B_2$ to form the fused record $A_1B_2^{10}$. The 30 units of supply or weight available from respondent $A_2$ are then allocated to satisfy the remaining 10 units of demand associated with $B_2$ and the remaining 20 units of demand associated with $B_3$ to form the fused records $A_2B_2^{10}$ and $A_2B_3^{20}$.

The resulting fused dataset F may then be analyzed to determine, for example, a relationship, if any, between Starbucks coffee consumption and the viewing of the television program Friends. In this example, the fused dataset F indicates that the percentage of the population that drinks Starbucks and also watches Friends (i.e., the percentage of weight contributed by fused records of the type $A_2B_1$) is zero.

FIG. 2 depicts an alternate fusion result that occurs when the order of the respondent records in the dataset B is changed. As shown in FIG. 2, the resulting fused dataset F contains fewer records but includes a fused record of the form $A_2B_1$ having a weight of 10 out of a total weight of 50 or 20%. Thus, in contrast to the fusion result depicted in FIG. 1, the fusion result depicted in FIG. 2 suggests that 20% of the population drinks Starbucks and also watches the television program Friends.

One known manner of reducing the effect of dataset or record ordering on fusion results, which has been illustrated by way of example in connection with FIGS. 1 and 2 above, is to run multiple fusions in which the order of the records within at least one of the datasets to be fused are reordered between fusions. For example, by running a relatively large number of fusions in which the records within at least one the datasets to be fused are randomly reordered between fusions and averaging the results, the effects of ordering can be significantly reduced. However, approaches based on such multiple fusions and averaging may consume an impractical amount of processing time and memory and may fail to sufficiently reduce or eliminate the effects of ordering.

Figure 3:
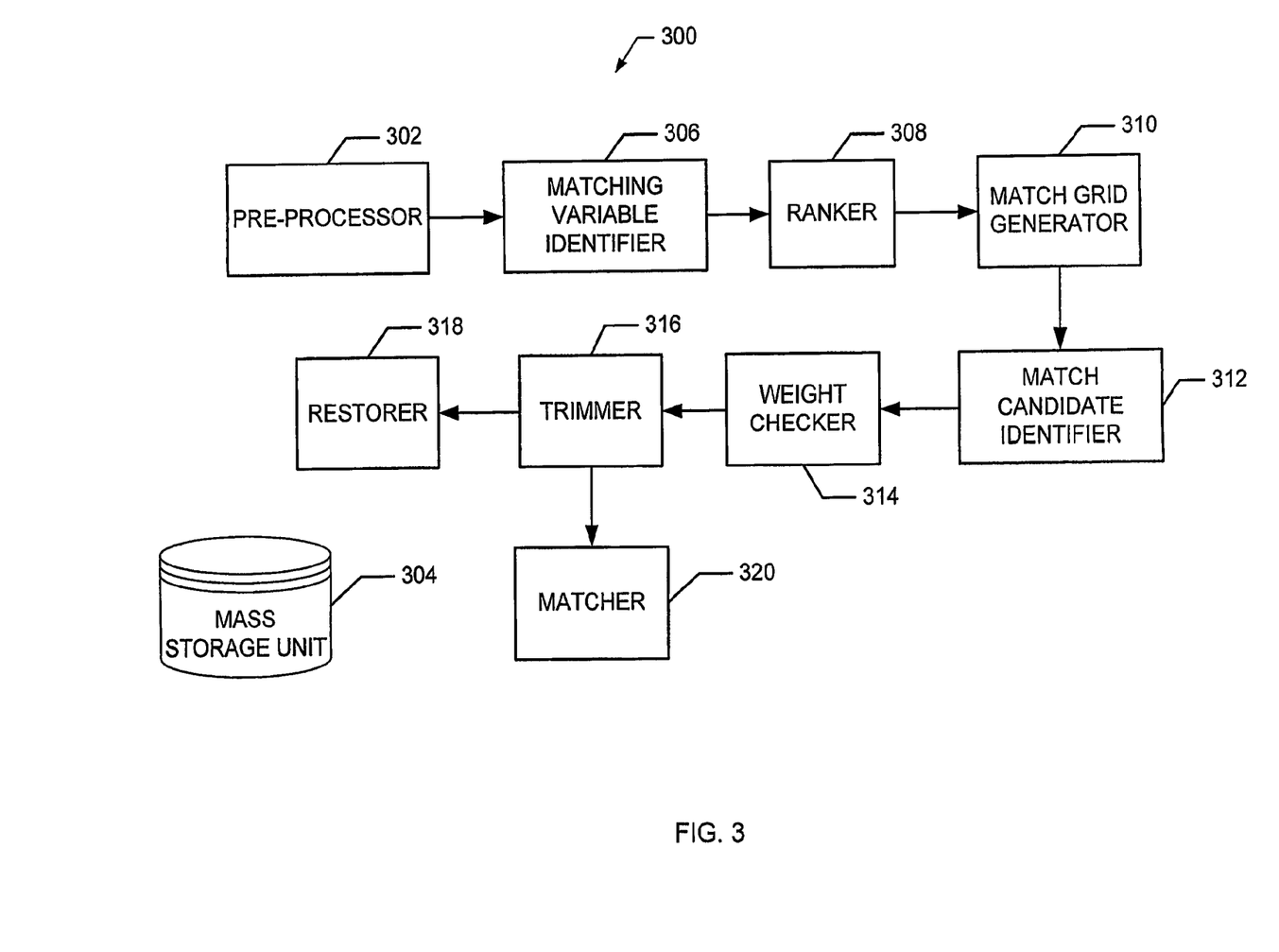
FIG. 3 is a block diagram of an example system that uses the probabilistic fusion methods described herein to fuse multiple datasets or databases into a single dataset or database.

Now turning to FIG. 3, a block diagram of an example system 300 that uses a probabilistic fusion method to fuse multiple datasets or databases into a single dataset or database is shown. The system 300 includes a pre-processor 302 that receives the datasets or databases to be fused from, for example, a mass storage unit 304 (e.g., a diskette, random access memory, etc.). In general, the pre-processor 302 may perform data synchronization activities, universe projections for common variables, and/or any other desired pre-processing activities on the datasets or databases to be fused. For example, in the case where the datasets to be fused contain market research information in the form of respondent records, the pre-processor 302 may determine whether one or more demographic categories (e.g., age, sex, race, household income, etc.) are collected and aggregated in similar or identical manners in the datasets to be fused. The pre-processor 302 may also, for example, determine whether the records within the datasets to be fused have comparable demographic data distributions. For example, in the case of the age demographic category, the pre-processor 302 may determine if the weighted samples or records correspond to age group frequency distributions so that weightings map or correspond to the percentages associated with the percentages of 25-30 year olds, 31-36 year olds, etc.

A matching variable identifier 306 receives the pre-processed datasets or databases from the pre-processor 302. The matching variable identifier 306 may be configured to identify or select matching variables by identifying variables that are significant using any desired statistical analysis, or combination of analysis techniques, of the records contained within one or both of the datasets to be fused. For example, stepwise regression analysis and/or principal components analysis may be used if desired. In some applications, the statistical analysis performed by the matching variable identifier 306 may be a symmetrical analysis that identifies variables that are significant for both of the datasets to be fused. In other applications, the statistical analysis performed by the matching variable identifier may be an asymmetrical analysis that identifies variables that are significant for only one of the datasets. For example, in the case of the datasets A and B to be fused in the example of FIGS. 1 and 2, an asymmetrical statistical analysis identifying common demographic variables significantly related to beer consumption (as opposed to television viewing) may be used.

A matching variable ranker 308 receives the matching variables generated by the matching variable identifier 306. The matching variable ranker 308 may rank matching variables based on, for example, the relative degree to which the matching variables statistically correlate to a desired characteristic or behavior associated with one or both of the datasets or databases to be fused. Such statistical ranking of matching variables may substantially eliminate the need to determine or measure the degree to which the matching variables are different from each other, as is the case when a known distance function is used.

A binary match grid generator 310 receives the ranked matching variables from the matching variable ranker 308 and uses the ranked matching variables to generate a binary match or matching grid. In general, the binary match grid generated by the binary match grid generator 310 may be represented as a table having n columns and $2^n$ rows or levels, where n equals the number of matching variables. Each column uniquely corresponds to one of the matching variables and a bit position of an n-bit binary value. The matching variables may be assigned to columns or bit positions so that higher order bit positions correspond to greater matching variable importance.

Each row or level of the binary match grid generated by the binary match grid generator 310 holds an n-bit binary value that specifies the match condition needed for each of the matching variables at that row or level to consider two database records (in respective databases to be fused) to be sufficiently matched. For example, a bit value of "1" in a cell of the grid may correspond to a required exact match condition, while a bit value of "0" may correspond to a non-matching or mismatch condition. Thus, in a case where there are four matching variables, a row or level of the binary match grid containing the binary value "1111" requires that the values of each of the four matching variables of first record match the values stored in the same matching variables of another record to establish a matching records condition. Likewise, a row or level of the binary match grid containing the value "1110" requires that the values of the three most important matching variables within two records match and that the last and least important matching variable does not match in the records.

In a case where the ranked matching variables provided by the matching variable ranker 308 are, in order of importance, Household Size ($V_1$), Income ($V_2$), Geography ($V_3$) and Presence of Kids ($V_4$), a binary match grid similar or identical to that shown in Table 1 below may be generated by the binary match grid generator 310.

TABLE 1

| $V_1$ | $V_2$ | $V_3$ | $V_4$ |
|---|---|---|---|
| 1 | 1 | 1 | 1 |
| 1 | 1 | 1 | 0 |
| 1 | 1 | 0 | 1 |
| 1 | 1 | 0 | 0 |
| 1 | 0 | 1 | 1 |
| 1 | 0 | 1 | 0 |
| 1 | 0 | 0 | 1 |
| 1 | 0 | 0 | 0 |
| 0 | 1 | 1 | 1 |

TABLE 1-continued

| $V_1$ | $V_2$ | $V_3$ | $V_4$ |
|---|---|---|---|
| 0 | 1 | 1 | 0 |
| 0 | 1 | 0 | 1 |
| 0 | 1 | 0 | 0 |
| 0 | 0 | 1 | 1 |
| 0 | 0 | 1 | 0 |
| 0 | 0 | 0 | 1 |
| 0 | 0 | 0 | 0 |

As described in greater detail below, a binary match grid such as the example grid shown in Table 1 may be used to perform a hierarchical matching of records in datasets or databases to be fused. In particular, successive rows of the match grid may be used to systematically vary the criteria or conditions needed to satisfy a matching records condition. For example, in the case where the match grid shown in Table 1 is used, the first row (i.e., "1111") would be used first to identify records matching on all four variables. If one or more records fail to satisfy the match condition of the first row (i.e., if one or more records were not matched on all four matching variables), then the second row (i.e., "1110") of the match grid may be used to match records that match on the three most important match variables, but which do not match on the least important match variable. If non-matching records remain following match identifications using the second row or level of the binary match grid, successive rows or levels may be used as described above until all records have been matched at some level of the grid. Of course, the last row or level of the grid shown in Table 1 is "0000" and, thus, records that fail to match on any of the matching variables could be considered matches at that level or row.

In some applications, the binary match grid generated by the binary match grid generator 310 may impose a minimum match level (i.e., a minimum number of match conditions). For example, imposing a minimum match level of 2 (i.e., matching records must have matches on at least two matching variables) results in rows or levels of the match grid requiring one or zero matches to be skipped or eliminated. Thus, imposing a minimum match level of 2 on the example grid shown in Table 1 results in elimination or skipping of the rows or levels containing the binary values "1000," "0100," "0010," "0001," and "0000."

The binary match grid generated by the binary match grid generator 310 may be further modified to enable skewed matching of one or more matching variables at one or more levels or rows of the binary matching grid. In general, the skewing of matching variables within the match grid enables skewed or offset matching of matching variables so that, for example, in a case where the discrimination strength between adjacent values (e.g., categories or ranges) within a matching variable is not significant, a match between the matching variable values (or categories) in different records may satisfy a match condition when the values are merely adjacent or close but not equal. In this manner, adjacent variables can be exhausted before moving on to the next row or level of the matching grid. Although broadly applicable, such skew-based matching may be particularly useful for pseudo-linear matching variables such as, for example, age, income, education levels, etc.) For example, in a case where the binary match grid generated by the binary match grid generator 310 contains the matching variable "Household Income," which may hold one of a plurality of income values or categories that range from $0 to $100,000 in $10,000 increments (e.g., $0-$10K, $10-$20K, $20K-$30K, $30K-$40K, etc.), it may be desirable to allow a match to occur in the event that matching variable values or categories are not equal but adjacent. For instance, the income categories $10K-$20K and $30K-$40K are adjacent to the income category $20K-$30K and, in the case skewed matching is allowed, may be considered sufficient matches to the income category $20K-$30K. Using such skewed matching may, for example, enable a respondent having (i.e., a respondent record containing) a household income of $10K-$20K to be matched to a respondent having a household income of $20K-$30K.

Allowing a skewed match between adjacent categories that are one category apart may be referred to as a first degree skewed match or a matching variable having a skew of degree one, which may be denoted "sk1." Likewise, allowing a match between adjacent categories that are two categories apart may be referred to as a second degree skewed match or a matching variable having a skew of degree two, which may be denoted "sk2." Of course, higher degrees of skewed matching may be allowed if needed to suit a particular application. An example of a binary match grid having three matching variables $V_1$, $V_2$ and $V_3$, where the variable $V_2$ is skew enabled (i.e., skewed matches on the variable $V_2$ are allowed), is shown in Table 2 below.

TABLE 2

| $V_1$ | $V_2$ | $V_3$ |
|---|---|---|
| 1 | 1 | 1 |
| 1 | sk1 | 1 |
| 1 | sk2 | 1 |
| 1 | 1 | 0 |
| 1 | sk1 | 0 |
| 1 | sk2 | 0 |
| 1 | 0 | 1 |
| 1 | 0 | 0 |
| 0 | 1 | 1 |
| 0 | sk1 | 1 |
| 0 | sk2 | 1 |
| 0 | 1 | 0 |
| 0 | sk1 | 0 |
| 0 | sk2 | 0 |
| 0 | 0 | 1 |
| 0 | 0 | 0 |

As can be seen above in Table 2, at every level in the binary match grid where matching for $V_2$ is enforced (i.e., where a cell associated with $V_2$ is non-zero), an exact match on $V_2$ is first required, followed by levels permitting first then second degree skews of $V_2$ so that skewed matches of first then second degree are allowed. The type of skew timing (i.e., the level at which and manner in which skewed matching is permitted) represented in the example of Table 2 may be referred to as a fast skew because $V_2$ is allowed to skew whenever matching for $V_2$ is enforced. Another type of skew timing that may be used is a relatively slow skew. An example slow skew timing is shown below in Table 3. As depicted in Table 3, the skewing of the skew variable $V_2$ only occurs at levels in the matching grid where the variable $V_2$ is the lesser-ranked variable among enforced matching variables (i.e., variables for which there is a binary "1" stored in a cell associated with the variables).

TABLE 3

| $V_1$ | $V_2$ | $V_3$ |
|---|---|---|
| 1 | 1 | 1 |
| 1 | 1 | 0 |
| 1 | sk1 | 0 |

TABLE 3-continued

| V₁ | V₂ | V₃ |
|---|---|---|
| 1 | sk2 | 0 |
| 1 | 0 | 1 |
| 1 | 0 | 0 |
| 0 | 1 | 1 |
| 0 | 1 | 0 |
| 0 | sk1 | 0 |
| 0 | sk2 | 0 |
| 0 | 0 | 1 |
| 0 | 0 | 0 |

Still another type of skew timing that may be employed only enables skewing to begin once a certain level of the matching grid has been reached. For example, in such an approach were applied to the example fast skew of Table 2 above so that skewing begins at level "110" and below, then Table 2 would be reconfigured as shown in Table 4 below.

TABLE 4

| $V_1$ | $V_2$ | $V_3$ |
|---|---|---|
| 1 | 1 | 1 |
| 1 | 1 | 0 |
| 1 | sk1 | 0 |
| 1 | sk2 | 0 |
| 1 | 0 | 1 |
| 1 | 0 | 0 |
| 0 | 1 | 1 |
| 0 | sk1 | 1 |
| 0 | sk2 | 1 |
| 0 | 1 | 0 |
| 0 | sk1 | 0 |
| 0 | sk2 | 0 |
| 0 | 0 | 1 |
| 0 | 0 | 0 |

The binary match grid generated by the binary match grid generator 310 is provided to the match candidate identifier 312. The match candidate identifier 312 uses the binary value from the current match grid level (e.g., initially the first level or row) to determine the match candidates from the datasets or databases to be fused. More specifically, the match candidate identifier 312 examines the records from each of the datasets or databases to be fused to identify those records that satisfy the match criteria of the currently selected binary match grid level. For example, in the case where the currently selected binary match grid level is the first level of the example grid shown in Table 1 (i.e., "1111"), then match candidates are those records in the datasets or databases to be fused that match on all four of the matching variables ($V_1, V_2, V_3$ and $V_4$).

To improve computational or processing efficiency during subsequent matching and fusing of individual records, the match candidate identifier 312 may form separate match sets or groups within the match candidates at each level of the match grid. For example, in a case where one or more of the matching variables includes more than one category, records in each of the datasets or databases to be fused may be separated based on that category. Thus, if the matching variables includes sex, age and race, then a first set or group may be defined as all Caucasian females that are 18-24 years old, a second group may be defined as all Caucasian females that are 25-34, a third group may be defined as all African American males that are 35-49 etc. In this manner, subsequent matching or fusing of records at each level of the matching grid may be achieved by considering and allowing matching or fusing of records only within like sets or groups, as opposed to considering matches or fusing of each records to all other records, regardless of which set or group of which it is a member. Of course, in the above example, if skewed matching is allowed on the age matching variable, then some degree of matching between sets or groups may be permitted in accordance with the defined skew.

The match candidate identifier 312 provides the match candidates or selected records in the form of two datasets, each of which may be sub-divided into two or more subsets or groups as described above) to a weight checker 314. The weight checker 314 sums the weights of the candidates (e.g., a particular set or group) from one of the datasets or databases to be fused and compares that sum to the sum of the weights of the candidates (e.g., a matching set or group) from the other one of the dataset or databases to fused to determine if the sums of weights are equal (i.e., balanced).

A dataset trimmer 316 receives the comparison results from the weight checker 314 and the match candidate datasets to be fused. If the dataset trimmer 316 determines, based on the comparison results received from the weight checker 314, that the datasets to be fused (i.e., the sets of match candidates) are not balanced (i.e., have different total weights), then trimmed portions of the overweight records are sent to a restorer 318, which restores those trimmed portions of the overweight (e.g., stores the trimmed portions in the mass storage unit 304) for subsequent use by the match candidate identifier 312 in a subsequent fusion performed using the next level in the binary match grid. On the other hand, in a case where the dataset trimmer 316 determines that the datasets to be fused are balanced, there are no trimmed portions to be sent to the restorer 318. In either case, the records held by the trimmer 316 are then sent to a matcher 320 to be fused together. The operations of the trimmer 316, the restorer 318 and the matcher 320, as well as the other structure shown in FIG. 3, are described in greater detail in connection with FIGS. 4, 5 and 6 below.

Also, it should be recognized that any or all of the structure shown in the example system 300 of FIG. 3 may be implemented using primarily software, firmware or instructions stored on a machine readable medium and executed by a processor and/or may be implemented using primarily hardware, including one or more application specific integrated circuits, discrete semiconductor devices, passive components, logic circuitry, analog circuitry, etc. Alternatively, any desired combination of hardware, software and/or firmware may be used.

Figure 4:
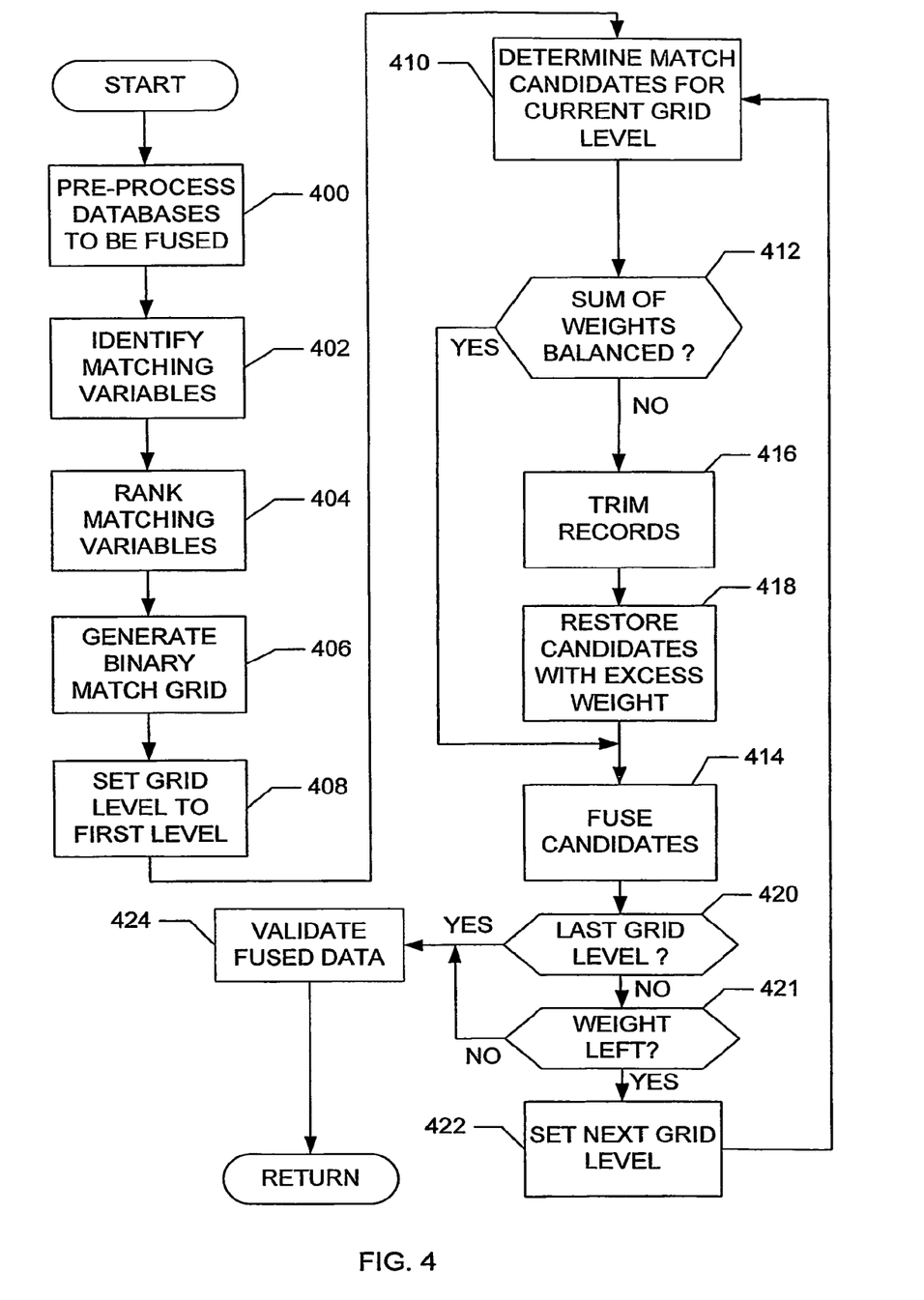
FIG. 4 is flow diagram depicting an example manner in which the system shown in FIG. 3 may be configured to perform a probabilistic fusion.

FIG. 4 is flow diagram depicting an example manner in which the system shown in FIG. 3 may be configured to perform a hierarchical probabilistic fusion of multiple datasets or databases. Initially, the datasets or databases to be fused are pre-processed (block 400) by the pre-processor 302 (FIG. 3). Following the pre-processing activities at block 400, matching variables are identified or selected (block 402) by the matching variable identifier 306 (FIG. 3). After identifying or selecting the matching variables (block 402), the selected matching variables are ranked (block 404) by the matching variable ranker 308 (FIG. 3). The ranked matching variables are then used by the binary match grid generator 310 (FIG. 3) to generate a binary match grid (block 406). As described in greater detail below, use of the binary match grid generated at block 406 enables all possible combinations of matching variables to be examined in order of importance.

After the binary match grid has been generated (block 406), the grid level to be used for determining whether records match is set to the first row or level of the match grid (block 408). For example, if the binary match grid generated at block 406 is one of the example grids shown in Tables 1, 2, 3 or 4 above, the first grid level corresponds to the binary value "1111" or "111." In other words, the first grid level of the above-described example binary match grids have a first level or row that requires an exact match on all of the matching variables for records to be matched.

The match candidates for the current grid level (initially the first level) are then selected by the match candidate identifier 312 (FIG. 3) (block 410). As described above in connection with FIG. 3, the match candidate identifier 312 may form separate sets or groups within the match candidates identified from each of the databases to be fused. Such sets or groups may be formed to facilitate the matching and/or fusing of like or matching records. After the match candidates from each of the datasets or databases to be fused have been identified or selected at block 410, the sum of the weights of the candidates for one of the datasets or databases to be fused is compared to the sum of weights of the candidates from the other one of the dataset or databases to be fused (e.g., by the weight checker 314 of FIG. 3) to determine if the sums of weights are balanced (i.e., equal) (block 412).

If the sums of weights of the datasets to be fused are equal (i.e., are balanced), the match candidates selected from each of the databases to be fused are fused or matched (block 414) (e.g., by the matcher 320 of FIG. 3). In general, the matching or fusing of candidates (i.e., records selected or identified at block 410 as satisfying the match criteria at the current grid level) at block 414 is performed so that the candidates from one of the datasets or databases are matched to all candidates from an identical matching (or a skewed matching) group or set from the other one of the datasets or databases in exact proportion to their original weights. In this manner, the operations of blocks 412, 414, 416 and 418 may be performed for each subset or group at each level of the matching grid. Thus, the number of fused records generated at block 414 (e.g., by the matcher 320 of FIG. 3) equals the number of candidates identified or selected from one of the datasets or databases to be fused multiplied by the number of candidates identified or selected from the other one of the datasets or databases to be fused. As a result, in contrast to known fusion techniques, each candidate gets matched with each like-candidate in a manner that is commensurate with the original weights of those candidates. In effect, each of the candidates (e.g., respondents) is matched with a composite profile of all like-candidates, and the resulting composite behavioral profile for this group of candidates is one that is reflective of all of its constituents.

Figure 5:
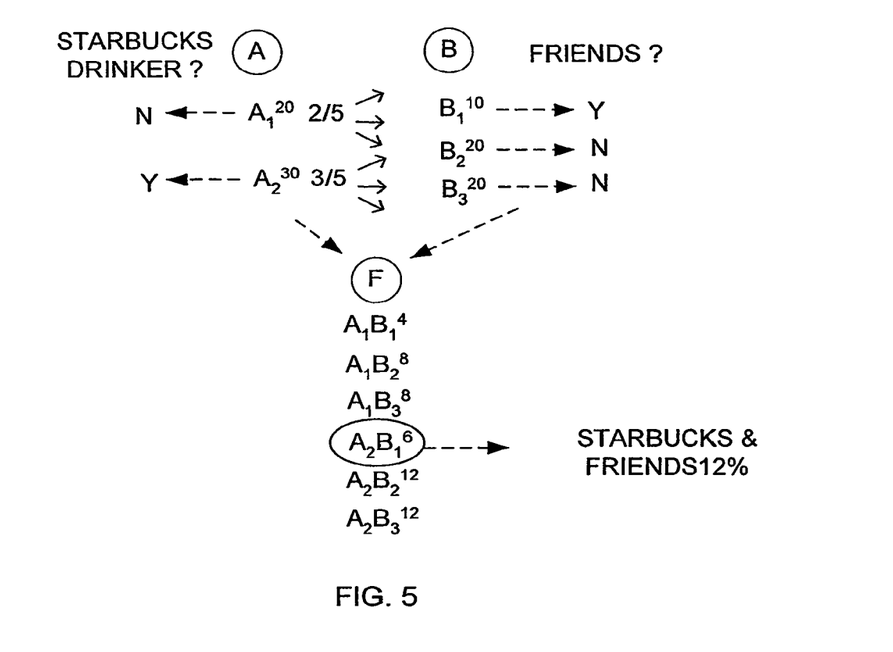
FIG. 5 depicts an example fusion of two datasets into a single fused dataset or database using an example probabilistic fusion method.

FIG. 5 depicts one example manner in which match candidates (i.e., selected records) selected or identified at block 410 (e.g., by the match candidate identifier 312 of FIG. 3) may be matched or fused at block 414 (e.g., by the matcher 320 of FIG. 3). As with the example depicted in FIGS. 1 and 2, one of the datasets or databases to be fused is labeled "A" and respondent records within that dataset or database contain a yes (Y) or no (N) answer in response to the question "Do you drink Starbucks?" The other dataset or database "B" includes respondent records that contain a yes or no answer in response to the question "Do you watch the television program Friends?" Of course, datasets or databases containing different types of records could be used instead.

When tested at block 412 (FIG. 4), the sums of weights of the example datasets A and B are found to be equal or balanced (i.e., both have a total weight of 50 units). Then, when processing the example datasets A and B at block 414, starting with the match candidates selected from the dataset A, behavioral proportions are preserved by assigning a probability to each of the records $A_1$ and $A_2$. In this example, the record $A_1$ is assigned the probability $2/5$, which is commensurate with its original proportion of the total or sum of weights of the candidates selected from the dataset A. Likewise, the record $A_2$ is assigned the probability $3/5$, which is commensurate with its proportion of the total weight. Each of the records $A_1$ and $A_2$ are then matched or fused with each of the records $B_1$, $B_2$ and $B_3$ to form the fused dataset or database F. Upon analyzing the fused dataset or database F, it can be determined that the proportion of those who both drink Starbucks and watch Friends (i.e., fused records of the type $A_2B_1$) is $6/50$ or 12%.

In practice, the sum of the weights of the datasets or databases to be fused (e.g., the candidates selected at block 410 and fused at block 414) often do not balance. In those cases, at block 412, the sums of weights are found to be unequal or unbalanced and the candidate records of the overweight dataset are trimmed or proportionally adjusted (e.g., using the trimmer 316 of FIG. 3) so that the total weight of those records equals the total weight of the candidate records to which the records from the overweight dataset are to be fused.

Figure 6:
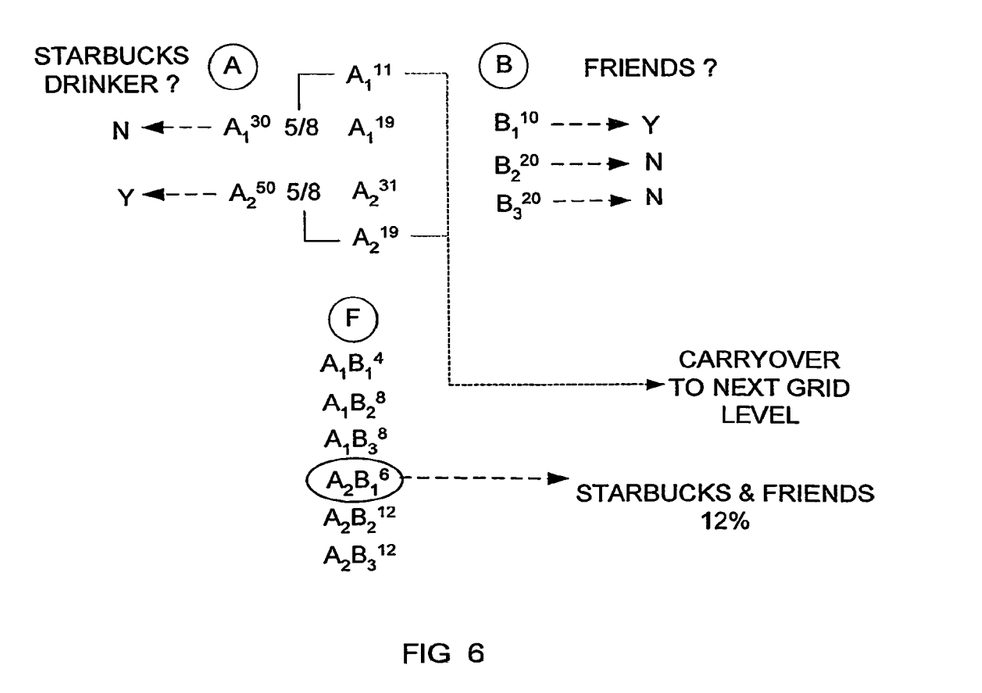
FIG. 6 depicts an example probabilistic fusion in which one of the datasets to be fused is overweight.

FIG. 6 depicts an example similar to that of FIG. 5, except that the weights of the records $A_1$ and $A_2$ have been increased to 30 and 50, respectively. In FIG. 6, the total weight of the dataset A is 80, which is greater than the total weight of the records in the dataset B (i.e., 50). The overweight records $A_1$ and $A_2$ are trimmed (e.g., using the trimmer 316 of FIG. 3) at block 416 (FIG. 4) by multiplying the weight of each of the records $A_1$ and $A_2$ by $5/8$ so that the total weight of the resulting trimmed dataset is 50 (i.e., balanced with the total weight of the dataset B). As shown in FIG. 6, the trimmed records $A_1$ and $A_2$ have respective weights 19 and 31.

After trimming at block 416, the overweight portions of the records (trimmed from the records at block 416) are restored to the database or dataset from which they were previously selected or extracted. Continuing with the example of FIG. 6, the trimmed portions of the candidate records $A_1$ and $A_2$ are restored (block 418) to the dataset or database from which they were selected at block 410. In particular, $A_1^{11}$ and $A_2^{19}$ are restored to the dataset or database from which they were selected and, as described in greater detail below, are carried over to the next level of the matching grid. After restoring the trimmed excess portions of the candidate records at block 418, the trimmed records (e.g., $A_1^{19}$ and $A_2^{31}$) are matched or fused to each of the candidate records $B_1$, $B_2$ and $B_3$ at block 414 as described in connection with FIG. 5 above.

After performing the matching or fusing of candidates or records at block 414 (FIG. 4), it is determined whether there is another grid level (block 420). If there is another grid level at block 420, it is determined whether there is any weight left to be fused (block 421). If, at block 421, there is more weight to be fused, then the next grid level of the matching grid is set as the current grid level (e.g., "1110" of the example grid shown in Table 1 if "1111" is the current grid level at block 420) (block 422). After setting the next grid level as the current grid level (block 422), the activities associated with the identification of match candidates (block 410), the trimming of records (block 416) and the matching of candidates (block 414) may be repeated until all of the weight of the dataset being fused has been consumed. However, if the last grid level has been used at block 420 or if there is no weight left to be fused at block 421, then the fused data may be validated (block 424) as described in greater detail below.

One well known fused dataset validation technique is commonly referred to as a foldover test. Known foldover tests split one of the original datasets or databases used to form the fused dataset into two equally weighted datasets. Those equally weighted datasets are then fused to each other using the fusion technique that generated the fused dataset to be validated. The fused dataset resulting from the foldover fusion is then analyzed to determine the accuracy, sensitivity, precision, etc. of the fusion technique.

A better understanding of known foldover techniques can be had by considering a particular example. For instance, consider a particular dataset of respondent records where each of the respondent records contains a yes (Y) or no (N) answer or tag to the question "Do you drink Starbucks?" That dataset is split into two datasets and the answers or tags relating to Starbucks drinking are removed from one of the two datasets and the two datasets are fused. An analysis of the resulting fused dataset then measures the degree to which the tags indicative of Starbucks consumption in the fused records match the removed tags associated with each fused record. For example, in a case where a fused record contains a tag indicating that the record is associated with a Starbucks drinker and the removed tag associated with that fused record also indicated a respondent that is a Starbucks drinker, then the match associated with that fused record is labeled a "True Positive." Likewise, in a case where a tag in the fused record indicates a non-drinker of Starbucks and the removed tag indicates the same behavior, then the match is labeled a "True Negative." On the other hand, in a case where the tag in the fused record incorrectly indicates the presence or absence of a Starbucks drinker, those records are labeled as "False Positive" and "False Negative," respectively. The indicators or labels (e.g., True Negative, True Positive, etc.) may be used to assess the accuracy, sensitivity, etc. of the fusion technique.

The above-described known foldover test technique is not well-suited for use with the probabilistic fusion technique described herein. Nor does the above-described known foldover technique provide the type of findings that marketers are typically expecting to exploit from a fusion of marketing datasets or databases. Specifically, many real-life behaviors are not necessarily of the Yes/No type. A more sophisticated behavior (such as segmenting drinkers into Low, Medium and High consumers) is often captured in datasets and it is expected that a fusion of such datasets should be capable of reporting its performance against these many behavioral nuances. Thus, a foldover test that determines the performance of a fusion in matching like-respondents against a variety of non-binary behavioral traits is needed.

Figure 7:
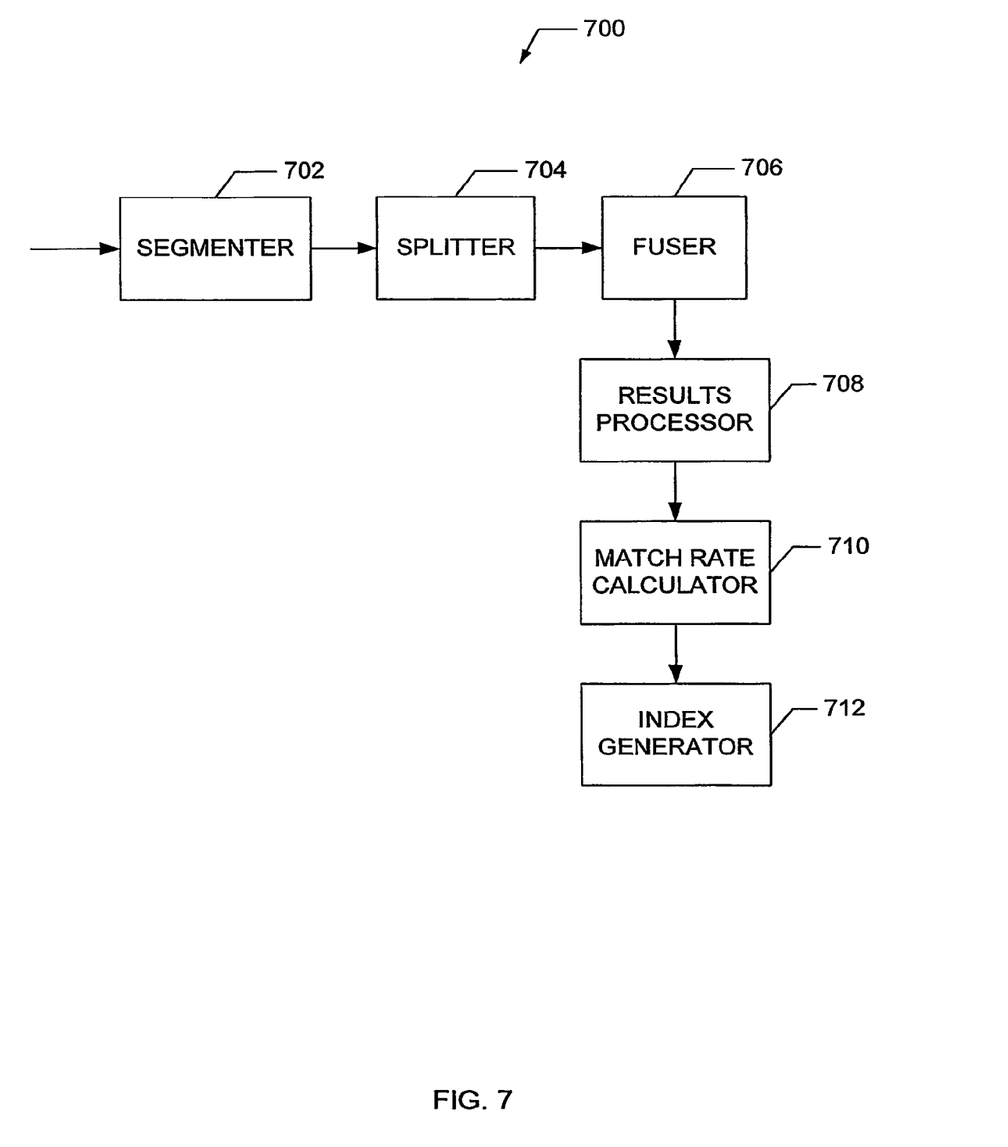
FIG. 7 is a block diagram of an example system that may be used to validate a probabilistic fusion.

An example of a foldover test that may be particularly useful when applied to a fused dataset generated using the probabilistic fusion techniques described herein, is described in connection with FIGS. 7, 8 and 9 below. In particular, FIG. 7 is a block diagram of an example system 700 that may be used to validate a probabilistic fusion such as, for example, the example probabilistic fusion apparatus and methods described above in connection with FIGS. 3 and 4. The system 700 includes a segmenter 702 that segments a dataset or database making up one of the original datasets to be fused into a plurality of usage classes (e.g., purchase levels). For example, in the case where the dataset A of FIG. 1 is segmented, the non-drinkers of Starbucks may be identified, and low (L), medium (M) and high (H) usage classes of Starbucks drinkers may be identified. However, any other segmentation scheme could be used by the segmenter 702.

A splitter 704 receives a segmented dataset from the segmenter 702 and splits the segmented dataset into two equally weighted datasets. The splitting operation performed by the splitter 704 may be based on a random splitting of the segmented dataset or any other desired splitting technique. A fuser 706 receives the equally weighted datasets generated by the splitter 704 and fuses the equally weighted datasets using, for example, the methods described by way of example in connection with FIG. 4.

A results processor 708 processes the fusion results developed by the fuser 706. For example, to eliminate bias that may be introduced as a result of the random or arbitrary splitting of the datasets by the splitter 704, the results may be averaged or combined in some other statistical manner.

The results generated by the results processor 708 are passed to a match rate calculator 710 that, as described in greater detail below, calculates match rates within each of the segments generated by the segmenter 702. In general, a match rate for a particular segment is based on the percentage of time that fused records are actually matching records.

An index generator 712 receives the match rate results from the match rate calculator 710 and compares the match rate results to frequency distribution information (e.g., the percentage of time that a segment occurs within the population of the original dataset or database) to generate indices. More specifically, the index generator 712 may divide a match rate for a particular segment by its corresponding frequency (i.e., occurrence rate) to generate an index value indicative of the performance of the fusion relative to a completely random fusion. In other words, the index values generated by the index generator 712 quantify the improvement that the fusion constitutes over a fusion based on blind targeting.

Figure 8:
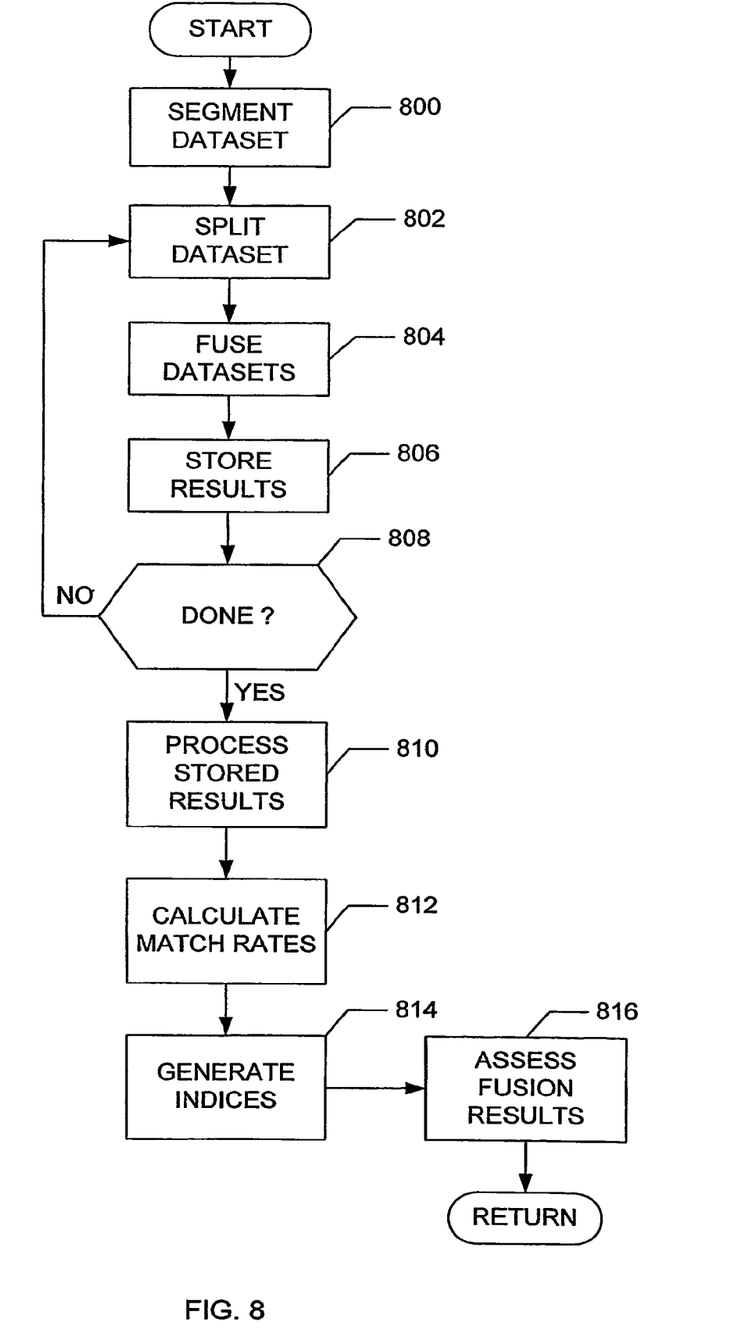
FIG. 8 is a flow diagram depicting one manner in which the system shown in FIG. 7 may be configured to validate a probabilistic fusion using a foldover analysis.

FIG. 8 is a flow diagram depicting one manner in which the system 700 shown in FIG. 7 may be configured to validate a probabilistic fusion using a foldover analysis. Initially, a dataset or database making up one of the original datasets to be fused is segmented (e.g., using the segmenter 702 of FIG. 7) into a plurality of usage classes (e.g., purchase levels) (block 800). The segmented dataset is then randomly split (e.g., by the splitter 704 of FIG. 7) into two equally weighted datasets (block 802). The equally weighted datasets generated at block 802 are then fused (e.g., by the fuser 708 of FIG. 7) using, for example, the method described by way of example in connection with FIG. 4 above (block 804) and the results (e.g., the fused dataset) are then stored for later retrieval (block 806).

It is then determined whether enough results have been stored (block 808). Preferably, but not necessarily, several sets of results are gathered by repeating blocks 802, 804 and 806. Thus, if additional results are needed at block 808, then control loops back to block 802. On the other hand, if additional results are not needed, then the stored results are processed (block 810). For example, to eliminate the bias that may be introduced as a result of the random or arbitrary splitting of the datasets at block 802, the results may be averaged or combined in some other statistical manner.

Figure 9:
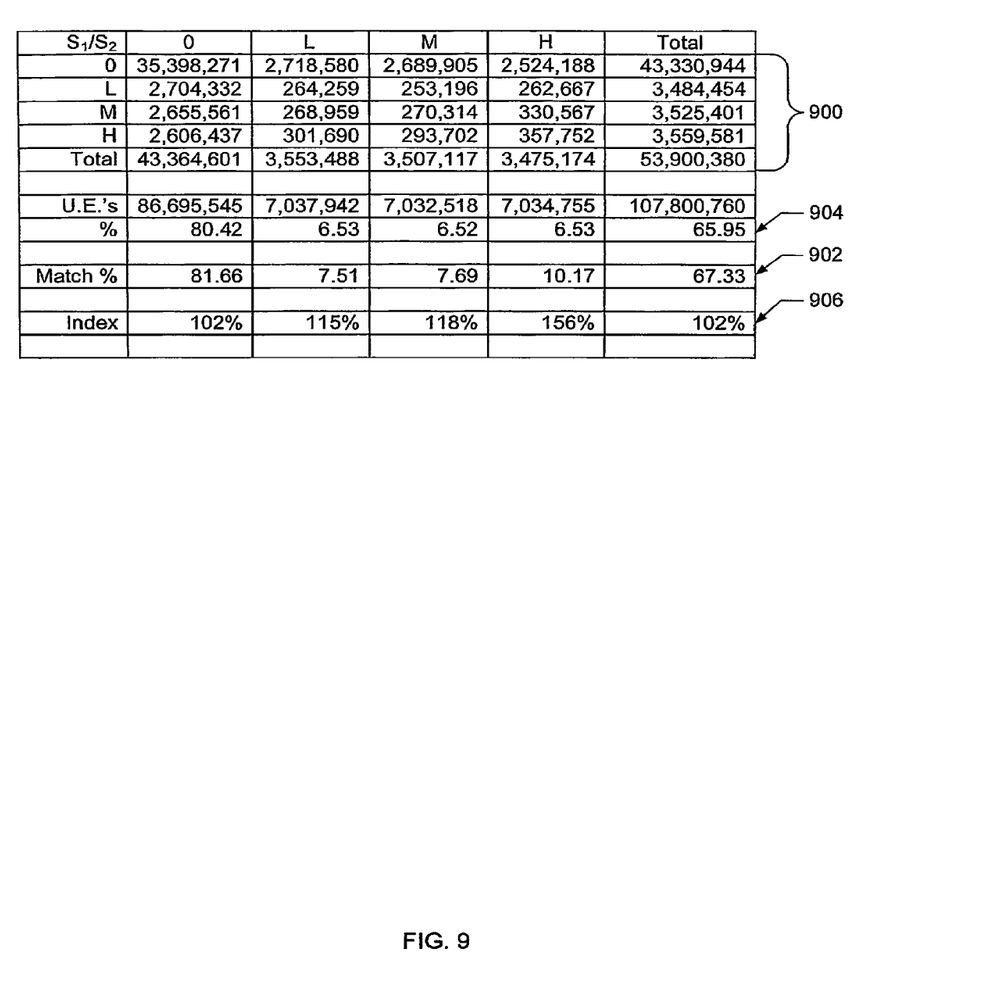
FIG. 9 depicts example foldover fusion results that may be obtained using the example validation system and/or method depicted in FIGS. 7 and 8.

The results processed at block 810 (which may be generated by the results processor 708) may, for example, be represented as shown in FIG. 9. In particular, match results 900 may be accumulated for each of the usage segments developed at block 800. The match results 900 may then be used to calculate match rates 902 within each of the usage segments. For example, as shown in FIG. 9, the match rate for non-drinkers of Starbucks is 81.66% (i.e., the percentage of non-drinkers that are matched or fused to non-drinkers). The match rates 902 and frequency distribution information 904 are compared to generate indices 906, which are indicative of the performance of the fusion relative to a completely random fusion.

The methods described herein (e.g., the example methods depicted in FIGS. 4 and 8) may be implemented using instructions or code stored on a machine readable medium that, when executed, cause a machine to perform all or part of the methods. For example, the instructions or code may be a program for execution within by a processor, such as the processor 1000 within the example processor-based system 1002 depicted in FIG. 10. The program may be embodied in software stored on a tangible medium such as a CD-ROM, a floppy disk, a disk drive, a digital versatile disk (DVD), or a memory associated with the processor 1000, but persons of ordinary skill in the art will readily appreciate that the entire program and/or parts thereof could alternatively be executed by a device other than the processor 1000 and/or embodied in firmware or dedicated hardware in a well-known manner. For example, any or all of the blocks shown in FIGS. 3 and 7, including the binary match grid generator 310, the match candidate identifier 312, the matcher 320, the segmenter 702, the splitter 704, the fuser 706 and/or the index generator 712 could be implemented by software, hardware, and/or firmware. Further, although the example program is described with reference to the flow diagrams illustrated in FIGS. 4 and 8, persons of ordinary skill in the art will readily appreciate that many other methods of implementing the methods described herein may alternatively be used. For example, the order of execution of the blocks may be changed, and/or some of the blocks described may be changed, eliminated, or combined.

Figure 10:
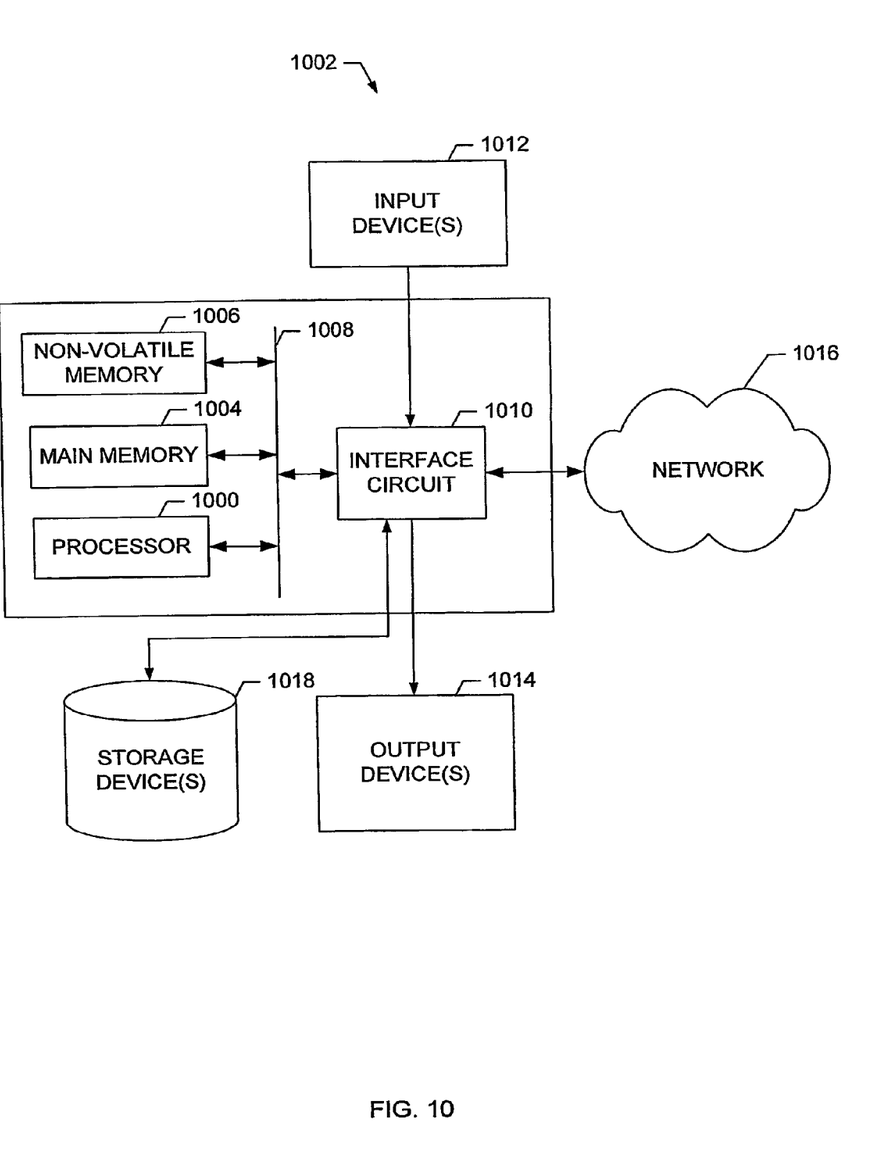
FIG. 10 is example processor-based system that may be used to perform the probabilistic fusion methods described herein.

Now turning in detail to FIG. 10, the example processor-based system 1002 may be, for example, a server, a personal computer, a personal digital assistant (PDA), an Internet appliance, a DVD player, a CD player, a digital video recorder, a personal video recorder, a set top box, or any other type of computing device.

The processor 1000 may, for example, be implemented using one or more Intel® microprocessors from the Pentium® family, the Itanium® family or the XScale® family. Of course, other processors from other families are also appropriate.

The processor 1000 is in communication with a main memory including a volatile memory 1004 and a non-volatile memory 1006 via a bus 1008. The volatile memory 1004 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1006 may be implemented by flash memory and/or any other desired type of memory device. Access to the memory 1004 is typically controlled by a memory controller (not shown) in a conventional manner.

The system 1000 also includes a conventional interface circuit 1010. The interface circuit 1010 may be implemented by any type of well-known interface standard, such as an Ethernet interface, a universal serial bus (USB), and/or a third generation input/output (3GIO) interface.

One or more input devices 1012 are connected to the interface circuit 1010. The input device(s) 1012 permit a user to enter data and commands into the processor 1000. The input device(s) can be implemented by, for example, a keyboard, a mouse, a touchscreen, a track-pad, a trackball, isopoint and/or a voice recognition system.

One or more output devices 1014 are also connected to the interface circuit 1010. The output devices 1014 can be implemented, for example, by display devices (e.g., a liquid crystal display, a cathode ray tube display (CRT), a printer and/or speakers). The interface circuit 1010, thus, typically includes a graphics driver card.

The interface circuit 1010 also includes a communication device such as a modem or network interface card to facilitate exchange of data with external computers via a network 1016 (e.g., an Ethernet connection, a digital subscriber line (DSL), a telephone line, coaxial cable, a cellular telephone system, etc.).

The system 1002 also includes one or more mass storage devices 1018 for storing software and data. Examples of such mass storage devices include floppy disk drives, hard drive disks, compact disk drives and digital versatile disk (DVD) drives.

Although certain methods and apparatus and articles of manufacture have been described herein, the scope of coverage of this patent is not limited thereto. To the contrary, this patent covers all methods, apparatus and articles of manufacture fairly falling within the scope of the appended claims either literally or under the doctrine of equivalents.

What is claimed is:

1. A method of fusing first and second datasets, comprising:
   determining an importance ranking of a plurality of variables associated with the first and second datasets;
   generating a hierarchical matching grid including a plurality of levels based on the importance ranking of the plurality of variables, wherein each of the levels defines match criteria for satisfying a matching records condition by indicating which of the variables are to match;
   identifying first and second sets of match candidates from the first and second datasets based on one of the plurality of levels of the hierarchical matching grid; and
   fusing records in the first and second sets of match candidates based on probabilities associated with the records.

2. A method as defined in claim 1, wherein determining the importance ranking of the plurality of variables includes ranking the plurality of variables based on a relative strength of a relationship between each of the variables and a respondent characteristic.

3. A method as defined in claim 1, wherein generating the hierarchical matching grid including the plurality of levels based on the importance ranking of the plurality of variables includes generating a series of binary values for each level of the hierarchical grid so that each of a plurality of bit positions associated with the binary values uniquely corresponds to one of the plurality of variables, wherein the binary values define whether a corresponding one of the variables is to match in the first and second sets of match candidates.

4. A method as defined in claim 1, wherein the generating the hierarchical matching grid including the plurality of levels based on the importance ranking of the plurality of variables includes generating the hierarchical matching grid to allow skewed matching on one or more of the variables.

5. A method as defined in claim 1, wherein generating the hierarchical matching grid including the plurality of levels based on the importance ranking of the plurality of variables includes establishing a minimum matching level.

6. A method as defined in claim 1, wherein identifying the first and second sets of match candidates from the first and second datasets based on the one of the plurality of levels of the hierarchical matching grid includes using match criteria from the one of the plurality of levels of the hierarchical matching grid to identify records in the second dataset that match records in the first dataset on ones of the plurality of variables defined by the match criteria.

7. A method as defined in claim 1, wherein fusing the records in the first and second sets of match candidates based on the probabilities associated with the records includes establishing the probabilities based on weights associated with records from at least one of the first and second sets of match candidates.

8. A method as defined in claim 1, further comprising:
   comparing a first sum of weights associated with the first set of match candidates with a second sum of weights associated with the second set of match candidates;

identifying one of the first and second sets of match candidates as overweight based on the comparison of the first and second sums of weights; and trimming records of one of the first and second sets of match candidates identified as overweight prior to fusing the records in the first and second sets of match candidates.

9. A system for fusing first and second datasets, comprising:
   a memory; and
   a processor coupled to the memory and configured to:
   determine an importance ranking of a plurality of variables associated with the first and second datasets;
   generate a hierarchical matching grid including a plurality of levels based on the importance ranking of the plurality of variables, wherein each of the levels defines match criteria for satisfying a matching records condition by indicating which of the variables are to match;
   identify first and second sets of match candidates from the first and second datasets based on one of the plurality of levels of the hierarchical matching grid; and
   fuse records in the first and second sets of match candidates based on probabilities associated with the records.

10. A system as defined in claim 9, wherein the processor is configured to determine the importance ranking of the plurality of variables by ranking the plurality of variables based on a relative strength of a relationship between each of the variables and a respondent characteristic.

11. A system as defined in claim 9, wherein the processor is configured to generate the hierarchical matching grid including the plurality of levels based on the importance ranking of the plurality of variables by generating a series of binary values for each level of the hierarchical grid so that each of a plurality of bit positions associated with the binary values uniquely corresponds to one of the plurality of variables, wherein the binary values define whether a corresponding one of the variables is to match in the first and second sets of match candidates.

12. A system as defined in claim 9, wherein the processor is configured to generate the hierarchical matching grid having the plurality of levels based on the importance ranking of the plurality of variables by generating the hierarchical matching grid to allow skewed matching on one or more of the variables.

13. A system as defined in claim 9, wherein the processor is configured to generate the hierarchical matching grid including the plurality of levels based on the importance ranking of the plurality of variables by establishing a minimum matching level.

14. A system as defined in claim 9, wherein the processor is configured to identify the first and second sets of match candidates from the first and second datasets based on the one of the plurality of levels of the hierarchical matching grid by using match criteria from the one of the plurality of levels of the hierarchical matching grid to identify records in the second dataset that match records in the first dataset on ones of the plurality of variables defined by the match criteria.

15. A system as defined in claim 9, wherein the processor is configured to fuse the records in the first and second sets of match candidates based on the probabilities associated with the records by establishing the probabilities based on weights associated with records from at least one of the first and second sets of match candidates.

16. A system as defined in claim 9, wherein the processor is configured to:
   compare a first sum of weights associated with the first set of match candidates with a second sum of weights associated with the second set of match candidates;
   identify one of the first and second sets of match candidates as overweight based on the comparison of the first and second sums of weights; and
   trim records of the one of the first and second sets of match candidates identified as overweight prior to fusing the records in the first and second sets of match candidates.

17. A machine readable medium having instructions stored thereon that, when executed, cause a machine to:
   determine an importance ranking of a plurality of variables associated with first and second datasets;
   generate a hierarchical matching grid including a plurality of levels based on the importance ranking of the plurality of variables, wherein each of the levels defines match criteria for satisfying a matching records condition by indicating which of the variables are to match;
   identify first and second sets of match candidates from the first and second datasets based on one of the plurality of levels of the hierarchical matching grid; and
   fuse records in the first and second sets of match candidates based on probabilities associated with the records.

18. A machine readable medium as defined in claim 17 having instructions stored thereon that, when executed, cause the machine to determine the importance ranking of the plurality of variables by ranking the plurality of variables based on a relative strength of a relationship between each of the variables and a respondent characteristic.

19. A machine readable medium as defined in claim 17 having instructions stored thereon that, when executed, cause the machine to generate the hierarchical matching grid including the plurality of levels based on the importance ranking of the plurality of variables by generating a series of binary values for each level of the hierarchical grid so that each of a plurality of bit positions associated with the binary values uniquely corresponds to one of the plurality of variables, wherein the binary values define whether a corresponding one of the variables is to match in the first and second sets of match candidates.

20. A machine readable medium as defined in claim 17 having instructions stored thereon that, when executed, cause the machine to generate the hierarchical matching grid including the plurality of levels based on the importance ranking of the plurality of variables by generating the hierarchical matching grid to allow skewed matching on one or more of the variables.

* * * * *